Nov. 1, 1960

J. B. CAMP 2,958,785

PINHOLE DETECTOR

Filed May 20, 1958

INVENTOR
JAMES B. CAMP
By Donald G. Dalton
Attorney

United States Patent Office 2,958,785
Patented Nov. 1, 1960

2,958,785
PINHOLE DETECTOR

James B. Camp, Fairfield, Ala., assignor to United States Steel Corporation, a corporation of New Jersey Filed May 20, 1958, Ser. No. 736,624

12 Claims. (Cl. 250—219)

This invention relates to a pinhole detector and more particularly to a pinhole detector for detecting pinholes in a moving steel strip. Such pinhole detectors require a light source and a detector unit which may be connected to a control indicator or counter. In order for the detector to work to the best advantage it is necessary that a high intensity light source be provided. Light sources are commonly incandescent lamps or glow tubes operating on a sine wave of applied voltage. The peak light available from these sources is proportional to the peak current through them. The applied voltage to a glow tube is in the nature of a sine function so that the peak current is approximately 1.414 times the root mean square current. Since the root mean square current for a given light source should be limited to the manufacturer's maximum rating, the peak light intensity is limited to approximately 1.414 times the root mean square intensity. The detector unit utilizes a phototube and in some instances the phototube will become paralyzed for a period of time when too much light falls on it.

It is therefore an object of my invention to provide a pinhole detector in which a light source includes a glow tube in which the light impulse is several times over its root mean square value.

Another object is to provide a pinhole detector in which the phototube is protected from excessive light.

These and other objects will be more apparent after referring to the following specification and attached drawings, in which.

Figure 1:
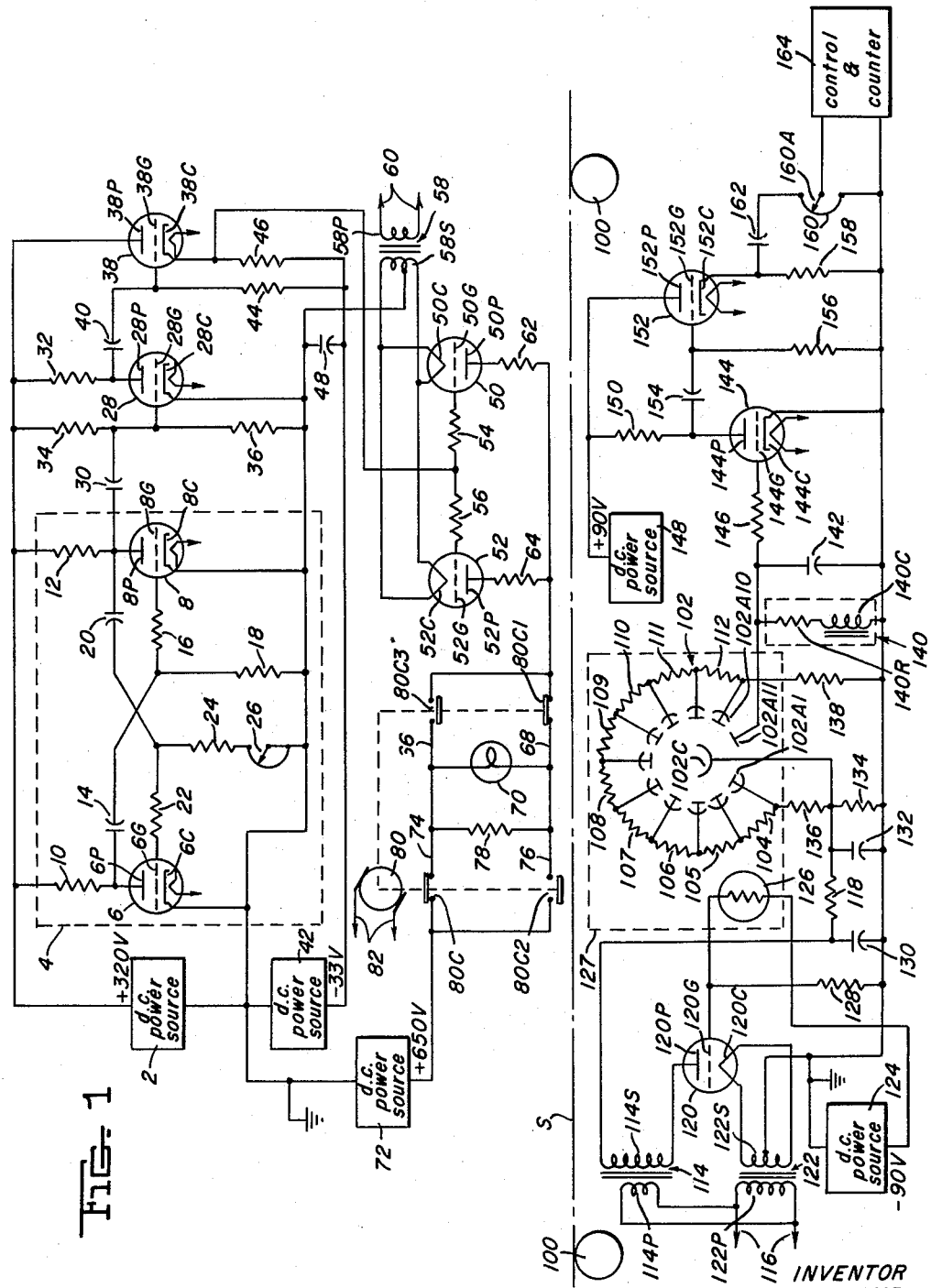
Figure 1 is a schematic view of the light and detector circuits located adjacent a strip in which pinholes are to be detected.

Referring more particularly to the drawings, reference numeral 2 indicates a 320 volt direct current power source. A free running asymmetrical multivibrator or modulator 4 is supplied with power from the power source 2. The multivibrator 4, which is generally described on pages 552 to 557 of Vacuum Tube Circuits by Arguimbau, John Wiley & Sons, consists of a dual triode vacuum tube 6 and 8. The plate 6P of tube 6 is connected to the positive side of the power source 2 through a resistor 10 and the cathode 6C is connected to ground. The plate 8P of tube 8 is connected to the positive side of power source 2 through a resistor 12 and the cathode 8C is connected to ground. The plate 6P is connected to grid 8G through a capacitor 14 and a resistor 16. The capacitor 14 is also connected to ground through a resistor 18. The plate 8P is connected to grid 6G through a capacitor 20 and resistor 22. The capacitor 20 is also connected to ground through a resistor 24 and adjustable rheostat 26. The capacitors 14 and 20 preferably have a capacity of 200 micromicrofarads. The resistors 10 and 12 preferably have a resistance of 39 kilo-ohms. The resistors 16 and 22 preferably have a resistance of 220 kilo-ohms. The resistor 18 preferably has a resistance of 270 kilo-ohms. The resistor 24 preferably has a resistance of 27 kilo-ohms and the rheostat 26 a resistance of 25 kilo-ohms. The plate 8P is connected to grid 28G of a negative impulse amplifier tube 28 through a capacitor 30. Plate 28P of tube 28 is connected to the positive side of power source 2 through a resistor 32 which preferably has a resistance of 47 kilo-ohms. The grid 28G is connected to the positive side of power source 2 through a resistor 34 and to ground through a resistor 36. Cathode 28C is connected to ground. Plate 28P is connected to grid 38G of a cathode follower tube 38 through a capacitor 40. Grid 38G is connected to the negative side of a D.C. power source 42 through a resistor 44. Plate 38P is connected to the positive side of D.C. power source 2. Cathode 38C is connected to the negative side of power source 42 through a resistor 46. A capacitor 48 is connected across the output of power source 42. The capacitor 30 preferably has a capacity of 500 micromicrofarads, capacitor 40 a capacity of .01 microfarad and capacitor 48 a capacity of .1 microfarad. Resistor 34 preferably has a resistance of 1 megohm. Resistors 32 and 36 preferably have a resistance of 47 kilo-ohms. Resistors 44 and 46 preferably have a resistance of 47 kilo-ohms. The cathode 38C is connected to grids 50G and 52G of power tubes 50 and 52 which are connected in parallel. Resistors 54 and 56 are arranged in the circuits of grids 50G and 52G. Cathodes 50C and 52C are connected to secondary 58S of a transformer 58. Primary 58P of the transformer is connected to a 115 volt A.C. power source 60. The output of secondary 58S is preferably 6.3 volts A.C. Secondary 58S is connected to ground. Plates 50P and 52P are connected through resistors 62 and 64 and lines 66 and 68 to a glow tube 70. The glow tube 70 is connected to the positive side of a D.C. power source 72 through lines 74 and 76. A resistor 78 is connected across lines 74 and 76. A motor driven timing relay 80 driven from 115 volt power source 82 has contacts 80C, 80C1, 80C2 and 80C3. Contact 80C is located in line 74, contact 80C1 in line 68, contact 80C2 in line 76 and contact 80C3 in line 66. The resistors 54 and 56 preferably have a resistance of 100 ohms, resistors 62 and 64 a resistance of 200 ohms, and resistor 78 a resistance of 10 kilo-ohms.

Figure 2:
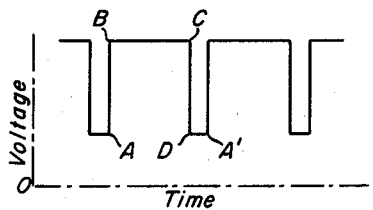
Figure 2 is an idealized wave form of the output of the modulator used in my invention.
Figure 3:
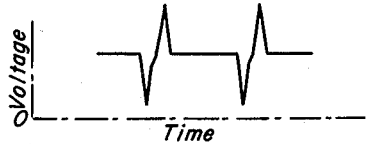
Figures 3, 4 and 5 are idealized wave forms at various points in the light source circuit.
Figure 4:
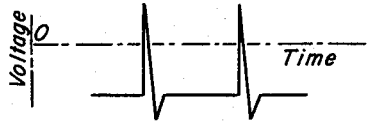
Figure 5:
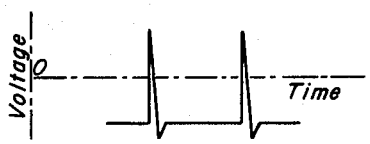
Figure 6:
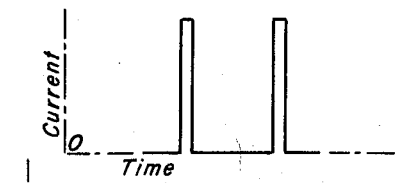
Figure 6 is a current wave form in the glow tube.

The operation of this portion of my device is as follows: The tubes 6 and 8 will theoretically conduct an equal amount of current at the instant a potential is applied. However, small differences in the electrical characteristics of the tubes prevent this theoretical balance from occurring. If tube 6 conducts more than tube 8, the plate voltage of tube 6 will decrease in respect to the plate of tube 8, and the grid 8G will go negative so that the current flow through tube 8 will decrease and the voltage drop across resistor 12 will decrease. Therefore, the plate voltage of tube 8 will rise and the grid 6G will become more positive so that tube 6 will conduct still more. This further reduces the plate voltage and causes the voltage of grid 8G to become more negative so that the voltage of plate 8P rises. This operation continues until the voltage of the idealized wave form, shown on Figure 2, rises from point A to point B. At this time, the capacitor 14 will discharge through resistor 18, the time of discharge being indicated by the line BC. This time is dependent upon the capacity of capacitor 14 and resistance of resistors 10 and 18. When the capacitor 14 is discharged the tube 8 will start conducting and will continue to conduct more and more until the voltage drops from point C to point D. At this time capacitor 20 will start discharging through resistor 24 and rheostat 26, the time of discharge being indicated by the line D—A'. By changing the setting on rheostat 26, this time may be varied. The tube 28 normally conducts heavily because the tube is approaching plate current saturation when no signal is applied from the multivibrator 4. When the voltage from multivibrator 4 passes through capacitor 30, it produces the wave form shown in Figure 3. Since the tube 28 is conducting close to its maximum, the positive impulse on grid 28G has little effect but when the impulse from multivibrator 4 decreases, the grid voltage decreases and the plate voltage rises. The voltage from plate 28P, after passing through capacitor 40, has the wave form shown in Figure 4. When the voltage of grid 38G varies, the voltage of cathode 38C also varies correspondingly. Thus, when there is minus 33 volts on grid 38G, there will be approximately minus 3 volts on cathode 38C. The wave form of the voltage on cathode 38C is shown in Figure 5. At minus 3 volts, that is when there is no pulse on the cathode 38C, tubes 50 and 52 will not conduct. However, when a positive pulse is on the cathode 38C and transmitted to the grids 50G and 52G, the tubes 50 and 52 will conduct heavily. In the position shown, current will flow from the positive side of power source 72 through closed contact 80C, tube 70, closed contact 80C1 and tubes 50 and 52 to ground. Periodically (for example every hour) the synchronous motor driven timing relay 80 reverses the position of its contacts. Thus, the open contacts 80C2 and 80C3 will close and the closed contact 80C and 80C1 will open, this causing current to flow through the tube 70 in the opposite direction. This prevents the tube 70 from polarizing. The resistor 78 is provided to supply plate voltage to tubes 50 and 52 prior to the time tube 70 fires. The light source provides an instantaneous light impulse which is 6.6 times the root mean square value of the glow tube 70 and yet provides light for a sufficient period of time at closely spaced intervals to permit travel of the strip at the maximum speeds now being used. The current wave form in tube 70 is shown in Figure 6.

A strip S, supported by rolls 100, passes beneath the tube 70 above a phototube 102. The phototube 102 shown is a multiplier phototube No. 931–A and has a light sensitive emitter or cathode 102C and 11 anodes 102A1 to 102A11. Resistors 104 to 112 are arranged between successive anodes. While only one phototube is shown it will be understood that in actual practice several such tubes may be connected in parallel and located across the width of the strip. The cathode 102C is connected to one side of secondary 114S of a transformer 114. Primary 114P is connected to a 115 volt A.C. power source 116. A resistor 118 is provided in the connection to the cathode 102C. The other side of the secondary 114S is connected to plate 120P of a grid controlled rectifier tube 120. Cathode 120C is supplied with current from secondary 122S of a transformer 122. Primary 122P of the transformer is connected to the power source 116 and the secondary 122S is connected to ground. Grid 120G is connected to the negative terminal of a D.C. power source 124 through a light sensitive cell 126. The photocell 126 is located beneath the strip S in a box 127 along with phototube 102 so that it will be flooded with light from the tube 70 when the strip S breaks or is not positioned below the tube 70 for any reason. When excessive light falls on the photocell 126 its cell current will increase, thus increasing the negative bias on grid 120G. This increase in grid bias reduces the load current of tube 120, thereby reducing the potential supply to phototube 102. The photocell 126 is also connected to ground through a resistor 128. Filter condensers 130 and 132 are connected from the respective terminals of resistor 118 to ground. A resistor 134 is connected in a circuit leading from resistor 118 to ground. A resistor 136 is located in the connection between resistor 118 and anode 102A1. Anode 102A10 is connected to ground through a resistor 138. Anode 102A11 is connected to a 6 kilocycle resonant circuit consisting of inductance 140 and a variable capacitor 142 connected to ground. Inductance 140 includes a resistor 140R and coil 140C connected in series. Anode 120A11 is also connected to grid 144G of tube 144 through a resistor 146. The cathode 144C is connected to ground and plate 144P is connected to a 90 volt D.C. power source 148 through a resistor 150. Plate 152P of a cathode follower tube 152 is connected to the positive terminal of power source 148. Grid 152G is connected to plate 144P through a capacitor 154 and to ground through a resistor 156. Cathode 152C is connected to ground through a resistor 158. A rheostat 160 and capacitor 162 are connected in series across resistor 158. Arm 160A of rheostat 160 is connected to a control and counter 164.

The operation of my device is as follows: During the time that the potential from secondary 114S is positive to the plate 120P and negative to resistor 118, tube 120, normally operating at zero (0) bias, will conduct a given amount of current so that minus 1000 volts will be on the line leading to cathode 102C and resistor 136. During this half cycle, the capacitors 130 and 132 will be charged and upon reversal of the potential across 114S, the capacitors 130 and 132 will discharge into their effective load, so that there will always be approximately minus 1000 volts at the cathode of tube 102. In the absence of a light signal, the voltage between resistors 104 and 105 will be approximately minus 900 volts, voltage between resistors 105 and 106 minus 800 volts, voltage between resistors 106 and 107 minus 700 volts, voltage between resistors 107 and 108 minus 600 volts, voltage between resistors 108 and 109 minus 500 volts, voltage between resistors 109 and 110 minus 400 volts, voltage between resistors 110 and 111 minus 300 volts, voltage between resistors 111 and 112 minus 200 volts, voltage between resistors 112 and 138 minus 100 volts and the voltage on anode 102A11 will approach 0.

Figure 7:
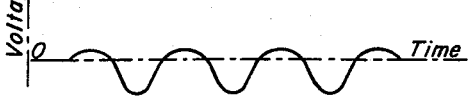
Figures 7, 8 and 9 are idealized wave forms showing the voltage at various points in the detector unit of my invention.

Assuming that a pinhole exists in the moving strip S so that light from tube 70 is falling on cathode 102C, there will be a flow of electrons from cathode 102C to anode 102A1. The voltage output curve from tube 102 is shown in Figure 7. This, like the output of light source 70, has a frequency of 6 kilocycles and the resonant circuit consisting of coil 140 and capacitor 142 also has a frequency of 6 kilocycles and a low impedance to all other frequencies, thereby providing a very effective filter for random electrical noise and impulses due to light from other sources. The 6 kilocycle signal passes from the filter circuit into tube 144 which acts as an oscillation damper to enable the resonant filter circuit to effect a quick recovery to its initial condition when the incoming signal ceases. In the absence of this tube, the amplitude of the signal will gradually decrease but the signal will remain for some time after the light is off tube 102.

Figure 8:
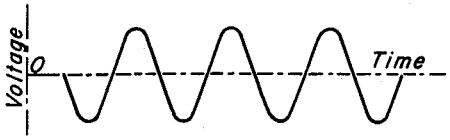
Figure 9:
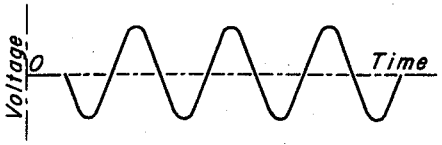

The tube 144 cuts off this signal rapidly by acting as a load for the resonant circuit. This permits accurate detection of closely spaced pinholes. In the absence of tube 144 such pinholes would not be detected. The signal from the tube 144 is applied to the cathode follower 152 to convert from high to low impedance so that the pinhole signal may be sent through several feet of cable into control on signal devices without appreciable noise pick-up or signal loss in the cable. The signal from the tube 152 is applied across the rheostat 160 which is provided to manually vary the value of the output signal to the control and/or counter 164. The voltage input curve to grid 152G is shown on Figure 8 and that to the control 164 on Figure 9. In both instances the frequency is 6 kilocycles. If a large amount of light were to fall on the cathode 102C, the tube 102 would become paralyzed and would not function properly for several minutes. The photocell 126 prevents this by increasing the negative bias on tube 120 thereby reducing the current through tube 120 and hence the voltage to tube 102.

While it is preferred to use the light source shown with the pick-up circuit shown, the light source could be used with any conventional pick-up circuit and the pick-up circuit could be used with any pulsating light source having the same frequency as the resonant circuit.

While one embodiment of my invention has been shown and described it will be apparent that other adaptations and modifications may be made without departing from the scope of the following claims.

I claim:

1. Apparatus for detecting pinholes in a moving object comprising a high frequency light source with the light being at its peak for a short time and at approximately zero for a relatively long time, said light source including a glow tube located on one side of the path of travel of said object, a D.C. power source, means connecting said glow tube to said power source and a free running asymmetrical multivibrator for controlling flow of current to said glow tube, a phototube located adjacent the path of travel of said object opposite said glow tube, means for supplying current to said phototube including a grid controlled rectifier tube, and means for cutting down the flow of current through said rectifier tube when a predetermined amount of light falls on said phototube.

2. Apparatus for detecting pinholes in a moving object comprising a high frequency light source with the light being at its peak for a short time and at approximately zero for a relatively long time, said light source including a glow tube located on one side of the path of travel of said object, a D.C. power source, means connecting said glow tube to said power source and a free running asymmetrical multivibrator for controlling flow of current to said glow tube, a phototube located adjacent the path of travel of said object opposite said glow tube, means for supplying current to said phototube, a resonant circuit connected to the output of said phototube, said resonant circuit including an inductance and capacitor connected in parallel, said resonant circuit having the same frequency as said light source, and a tube having a plate, cathode and grid, the grid of said last named tube being connected to said resonant circuit.

3. Apparatus for detecting pinholes in a moving object comprising a high frequency light source with the light being at its peak for a short time and at approximately zero for a relatively long time, said light source including a glow tube located on one side of the path of travel of said object, a D.C. power source, means connecting said glow tube to said power source and a free running asymmetrical multivibrator for controlling flow of current to said glow tube, a phototube located adjacent the path of travel of said object opposite said glow tube, means for supplying current to said phototube including a grid controlled rectifier tube, means for cutting down the flow of current through said rectifier tube when a predetermined amount of light falls on said phototube, a resonant circuit connected to the output of said phototube, said resonant circuit including an inductance and capacitor connected in parallel, said resonant circuit having the same frequency as said light source, and a tube having a plate, cathode and grid, the grid of said last named tube being connected to said resonant circuit.

4. Apparatus for detecting pinholes in a moving object comprising a high frequency light source with the light being at its peak for a short time and at approximately zero for a relatively long time, said light source including a glow tube located on one side of the path of travel of said object, a free running asymmetrical multivibrator, a negative impulse amplifier tube connected to the output of said multivibrator, a cathode follower tube connected to the amplifier tube, a power tube having its grid connected to said cathode follower tube, a D.C. power source, means connecting said glow tube and power tube in series to said D.C. power source and means for periodically changing the direction of current flow through said glow tube, a phototube located adjacent the path of travel of said object opposite said glow tube, means for supplying current to said phototube including a grid controlled rectifier tube, and means for cutting down the flow of current through said rectifier tube when a predetermined amount of light falls on said phototube.

5. Apparatus for detecting pinholes in a moving object comprising a high frequency light source with the light being at its peak for a short time and at approximately zero for a relatively long time, said light source including a glow tube located on one side of the path of travel of said object, a free running asymmetrical multivibrator, a negative impulse amplifier tube connected to the output of said multivibrator, a cathode follower tube connected to the amplifier tube, a power tube having its grid connected to said cathode follower tube, a D.C. power source, means connecting said glow tube and power tube in series to said D.C. power source and means for periodically changing the direction of current flow through said glow tube, a phototube located adjacent the path of travel of said object opposite said glow tube, means for supplying current to said phototube, a resonant circuit connected to the output of said phototube, said resonant circuit including an inductance and capacitor connected in parallel, said resonant circuit having the same frequency as said light source, and a tube having a plate, cathode and grid, the grid of said last named tube being connected to said resonant circuit.

6. Apparatus for detecting pinholes in a moving object comprising a high frequency light source with the light being at its peak for a short time and at approximately zero for a relatively long time, said light source including a glow tube located on one side of the path of travel of said object, a free running asymmetrical multivibrator, a negative impulse amplifier tube connected to the output of said multivibrator, a cathode follower tube connected to the amplifier tube, a power tube having its grid connected to said cathode follower tube, a D.C. power source, means connecting said glow tube and power tube in series to said D.C. power source and means for periodically changing the direction of current flow through said glow tube, a phototube located adjacent the path of travel of said object opposite said glow tube, means for supplying current to said phototube including a grid controlled rectifier tube, means for cutting down the flow of current through said rectifier tube when a predetermined amount of light falls on said phototube, a resonant circuit connected to the output of said phototube, said resonant circuit including an inductance and capacitor connected in parallel, said resonant circuit having the same frequency as said light source, and a tube having a plate, cathode and grid, the grid of said last named tube being connected to said resonant circuit.

7. Apparatus for detecting pinholes in a moving object comprising a high frequency light source with the light being at its peak for a short time and at approximately zero for a relatively long time, said light source including a glow tube located on one side of the path of travel of said object, a free running asymmetrical multivibrator, a negative impulse amplifier tube connected to the output of said multivibrator, a cathode follower tube connected to the amplifier tube, a power tube having its grid connected to said cathode follower tube, a D.C. power source, means connecting said glow tube and power tube in series to said D.C. power source and means for periodically changing the direction of current flow through said glow tube, a multiplier phototube located adjacent the path of travel of said object opposite said glow tube, said phototube having a cathode and several anodes, means for supplying current to said phototube including a grid controlled rectifier tube, a photocell located adjacent said phototube and connected in the grid circuit of said rectifier tube, a resonant circuit connected to the last of the anodes of said phototube, said resonant circuit including an inductance and capacitor connected in parallel, said resonant circuit having the same frequency as said light source, a tube having a plate, cathode and grid, the grid of said last named tube being connected to said resonant circuit, a cathode follower tube connected to the plate of said last named tube, and means connected to be operated by flow of current through said last named cathode follower tube.

8. Apparatus for detecting pinholes in a moving object comprising a high frequency pulsating light source located on one side of the path of travel of said object, a phototube located adjacent the path of travel of said object opposite said light source, a resonant circuit connected to the output of said phototube, said resonant circuit including an inductance and capacitor connected in parallel, said resonant circuit having the same frequency as said light source, and a tube having a plate, cathode and grid, the grid of said last named tube being connected to said resonant circuit.

9. Apparatus for detecting pinholes in a moving object comprising a high frequency pulsating light source located on one side of the path of travel of said object, a phototube located adjacent the path of travel of said object opposite said light source, means for supplying current to said phototube including a grid controlled rectifier tube, means for cutting down the flow of current through said rectifier tube when a predetermined amount of light falls on said phototube, a resonant circuit connected to the output of said phototube, said resonant circuit including an inductance and capacitor connected in parallel, said resonant circuit having the same frequency as said light source, and a tube having a plate, cathode and grid, the grid of said last named tube being connected to said resonant circuit.

10. Apparatus for detecting pinholes in a moving object comprising a high frequency pulsating light source located on one side of the path of travel of said object, a phototube located adjacent the path of travel of said object opposite said light source, means for supplying current to said phototube including a grid controlled rectifier tube, a photocell located adjacent said phototube and connected in the grid circuit of said rectifier tube, a resonant circuit connected to the output of said phototube, said resonant circuit including an inductance and capacitor connected in parallel, said resonant circuit having the same frequency as said light source, a tube having a plate, cathode and grid, and the grid of said last named tube being connected to said resonant circuit.

11. Apparatus for detecting pinholes in a moving object comprising a high frequency pulsating light source with the light being at its peak for a short time and at approximately zero for a relatively long time, said light source being located on one side of the path of travel of said object, a multiplier phototube located adjacent the path of travel of said object opposite said light source, said phototube having a cathode and several anodes, means for supplying current to said phototube including a grid controlled rectifier tube, a photocell located adjacent said phototube and connected in the grid circuit of said rectifier tube, a resonant circuit connected to the last of the anodes of said phototube, said resonant circuit including an inductance and capacitor connected in parallel, said resonant circuit having the same frequency as said light source, and a tube having a plate, cathode and grid, the grid of said last named tube being connected to said resonant circuit.

12. Apparatus for detecting pinholes in a moving object comprising a high frequency pulsating light source with the light being at its peak for a short time and at approximately zero for a relatively long time, said light source being located on one side of the path of travel of said object, a multiplier phototube located adjacent the path of travel of said object opposite said light source, said phototube having a cathode and several anodes, means for supplying current to said phototube including a grid controlled rectifier tube, a photocell located adjacent said phototube and connected in the grid circuit of said rectifier tube, a resonant circuit connected to the last of the anodes of said phototube, said resonant circuit including an inductance and capacitor connected in parallel, said resonant circuit having the same frequency as said light source, a tube having a plate, cathode and grid, the grid of said last named tube being connected to said resonant circuit, a cathode follower tube connected to the plate of said last named tube, and means connected to be operated by flow of current through said cathode follower tube.

References Cited in the file of this patent

UNITED STATES PATENTS

| | | |
|---|---|---|
| 2,396,023 | Schantz | Mar. 5, 1946 |
| 2,622,147 | Condliffe et al. | Dec. 16, 1952 |
| 2,741,725 | Thomas | Apr. 10, 1956 |
| 2,750,518 | Fahrner et al. | June 12, 1956 |
| 2,812,447 | MacMartin et al. | Nov. 5, 1957 |
| 2,840,721 | Frommer | June 24, 1958 |